April 10, 1934.  R. NEUHAUS  1,954,643
VALVE STEM PACKING
Filed Jan. 13, 1931

Ralph Neuhaus INVENTOR

BY Jesse R. Stone
ATTORNEY

Patented Apr. 10, 1934

1,954,643

UNITED STATES PATENT OFFICE 1,954,643

VALVE STEM PACKING

Ralph Neuhaus, Houston, Tex., assignor to Hughes Tool Company, Houston, Tex., a corporation of Texas Application January 13, 1931, Serial No. 508,426

4 Claims. (Cl. 251—62)

My invention relates to packing for use about the stem of a valve, and pertains particularly to packing for gate valves.

In valves which work under high fluid pressure it is sometimes difficult, due to the fluid pressure, to change or adjust the packing about the stem when said packing becomes worn or broken. Various devices have been developed for this purpose, but most of them are objectionable for various reasons, such as cost, time consumed, and the like.

It is an object of my invention to provide a valve stem which may be moved to prevent leakage when repairs are made on the packing without material change and without trouble or expense.

I desire to provide means for moving a valve stem of the non-rising stem type sufficiently to make a seal with the valve bonnet for temporary purposes while the packing is being removed.

In the drawing herewith, Fig. 1 is a central vertical section through a valve equipped with my invention.

Figures 1, 2, 3:
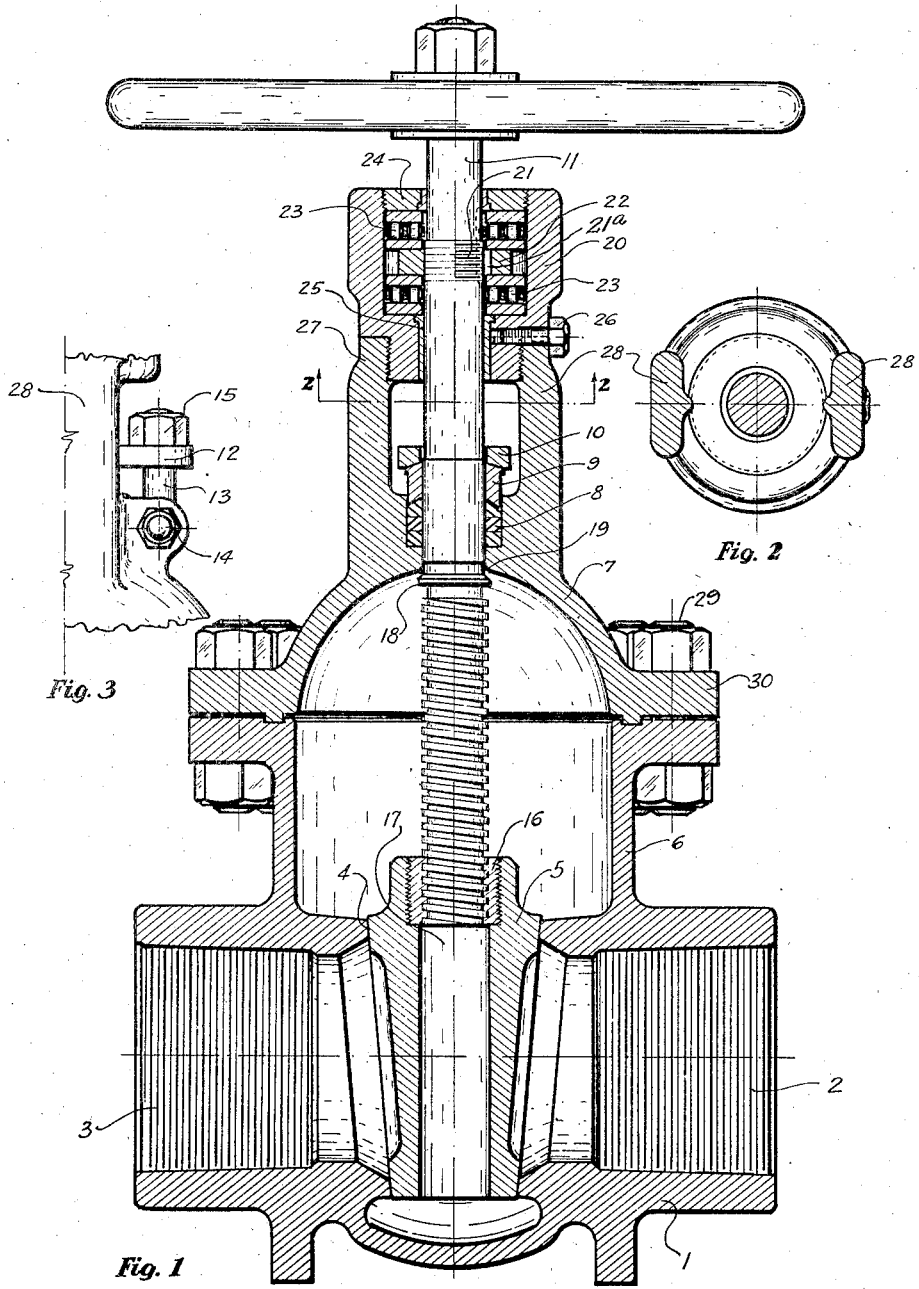
Fig. 2 is a transverse section on the plane 2—2 of Fig. 1, looking in the direction of the arrows.
Fig. 3 is a broken detail, illustrating the means for tightening the packing.

The valve shown is a gate valve with a non-rising stem. It is of ordinary construction but has my invention upon the stem and bonnet for adjusting the packing. It has a body 1, having a passage therethrough with threaded ends 2 and 3 for coupling within a fluid conducting line. The valve seat 4 is downwardly tapered and a wedge-shaped gate 5 is adapted to fit said seat and close said passage.

The valve body has a lateral extension or bonnet 6, the outer cap 7 of which is secured to the inner portion 6 by radial flanges 30 bolted to the body by bolts 29 in the usual manner.

The bonnet cap 7 has a stuffing box including a packing 8 fitting in a recess about the valve stem 11 with a gland 9 thereon adapted to be clamped upon the packing by a plate 10, the ends 12 of which extend laterally and have openings therein to receive bolts 13 secured pivotally to lugs 14 on the bonnet and provided with nuts 15 to clamp the plate downwardly.

The valve stem 11 has a threaded connection with a bushing 16 secured in the upper end of a longitudinal opening 17 through the gate. Below the stuffing box, said stem has a short radial flange 18 which is tapered on its upper side to fit a tapered seat 19 in the bonnet.

Above the stuffing box, the stem is supported in a plug 20, the lower end of which is reduced in outer diameter and threaded to screw within the ring 27, supported on legs 28 extending from the cap 7 outwardly past the stuffing box 8 on the bonnet. Within the plug 20 the stem is threaded at 21 to receive a radial plate or flange 22 secured thereto, the stem having a thread embossed thereon, upon which the plate is screwed. A key 21ª locks the flange against unscrewing.

Above and below this flange are antifriction bearings 23, comprising rollers riding on hardened washers on opposite sides thereof. The stem with its bearings thus provided is held within the box or plug by a nut 24, screwed into the outer end thereof. I may provide small bushings 25 about the stem within the box and said box 20 is held against unscrewing from the ring 27 by a set screw 26, as shown.

When it becomes desirable to adjust or change the packing about the valve stem during the use of the valve, the stem must be moved outwardly to bring the flange 18 into the seat 19, thus forming a temporary seal at that point.

This is done when the valve is in open position by removing the set screw 26 and unscrewing the box or plug 20 a slight distance. But when the valve is closed the valve stem simultaneously will be screwed outwardly from the valve gate to seat the said flange 18. When this seal is formed the plate 12 on the packing gland may be loosened and moved to allow access to the packing which may be changed or renewed, as desired. When the packing has been repaired and the gland again secured in position, the valve stem may be again moved inwardly to its original position and the box 20 secured in position and locked, as before.

I am thus enabled to repair the packing without the escape of fluid and without interfering with the operation of the line upon which the valve is used. This is done without difficulty or expense and without danger to the operator.

What I claim as new is:

1. A gate valve, a non-rising stem on said valve, a bonnet about said stem and valve, a stuffing box in said bonnet about said stem, a bearing member about said stem outside said box, a thrust bearing engaging said member about said stem, means on said stem within said bonnet to form a seal therewith when said stem is moved outwardly and means to move said stem and bearing outwardly.

2. A gate valve, a non-rising stem on said valve, a bonnet about said stem and valve, a stuffing box in said bonnet about said stem, a bearing member about said stem outside said box, a thrust bearing engaging said member upon said stem, means on said stem within said bonnet to form a seal therewith when said stem is moved outwardly and means to move said stem and bearing outwardly, said last named means including a flange on said stem.

3. A gate valve, a stem on said valve, a bonnet through which said stem projects, a stuffing box about said stem, retaining means outside said bonnet to normally prevent longitudinal movement of said stem, additional means on said stem to form a seal with said bonnet when said stem is moved slightly outward, and means to move said retaining means and said stem.

4. In a gate valve, a housing, a bonnet thereon, a gate in said housing, retaining means to normally hold said stem against longitudinal movement, packing means in said bonnet, and means on said stem arranged to seat on said bonnet to form a seal therewith, when said stem is moved longitudinally outward, said retaining means being adapted to unscrew from said bonnet while said stem is moved slightly outward.

RALPH NEUHAUS.